M. EUSTACE.
Machine for Thinning Crops.
No. 159,169. Patented Jan. 26, 1875.
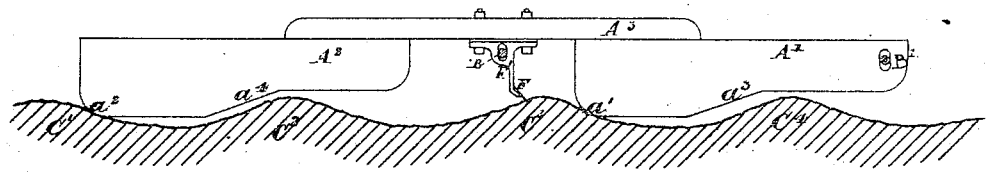
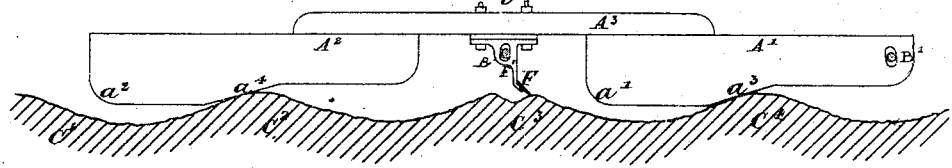
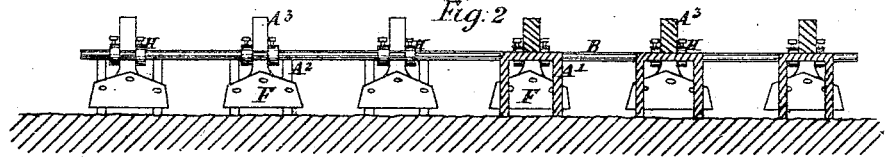
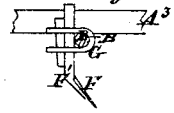
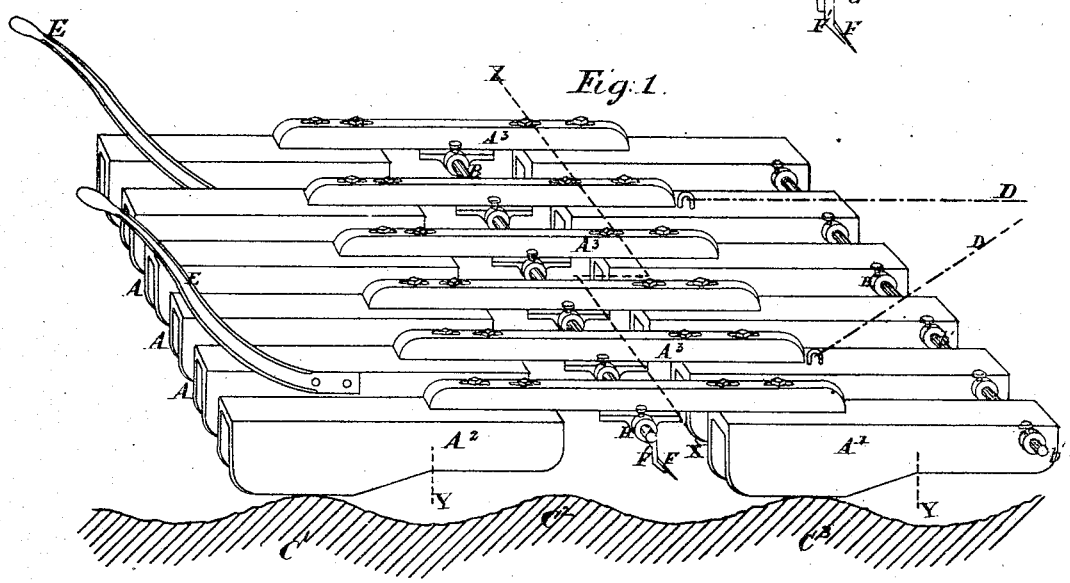
Witnesses:
H. A. Daniels
A. K. Pains
Inventor:
Marcus Eustace by
Chas. S. Whitman atty

UNITED STATES PATENT OFFICE.

MARCUS EUSTACE, OF HIGHFIELD, DRUMCONDRA, ASSIGNOR TO JAMES KENNAN AND THOMAS KENNAN, OF DUBLIN, IRELAND.

IMPROVEMENT IN MACHINES FOR THINNING CROPS.

Specification forming part of Letters Patent No. 159,169, dated January 26, 1875; application filed December 6, 1873.

*To all whom it may concern:*

Be it known that I, MARCUS EUSTACE, M. D., of Highfield, Drumcondra, in the county of Dublin, Ireland, have invented a new or Improved Machine for Thinning or Spacing Root and other Crops; and do hereby declare that the following description, taken in connection with the accompanying drawings hereinafter referred to, forms a full and exact specification of the same, wherein I have set forth the nature and principles of my said improvement, by which my invention may be distinguished from others of a similar class, together with such parts as I claim and desire to secure by Letters Patent—that is to say:

In the cultivation of root and other crops, such as turnips, cotton-plants, and the like, it is usual to sow the seed on drills or ridges in a continuous line, and, after the young plants have sprouted, to remove all the plants except tufts of a few together left at regular intervals, which tufts are afterward thinned by hand.

My present invention consists in the construction and use of a machine whereby the operation of hoeing, and the spacing of the tufts left standing, is effected with regularity and rapidity. Such machine consists of a series of hoe-blades arranged side by side at certain distances apart, and connected to guides in front of and behind the said hoes, the guides being of such construction that as the machine is drawn transversely across the ridges and furrows, a wave-like motion is imparted to the hoe-blades, such that they are made to remove from the top of each successive ridge portions of the row of plants, leaving tufts standing in the spaces between the hoes, and that by the subsequent rising of the hoe-blades the removed plants and mold are caused to fall from them into the furrows between the ridges.

The construction of this machine is shown on the accompanying drawings.

Figure 1 shows a perspective view of the machine. Fig. 2 shows a transverse section on line X X, Fig. 1; and Figs. 3 and 4 are diagrams serving to show the action of the machine in passing over the ridges.

The machine consists of six like parts or frames, A, coupled together by rods or shafts B B', so as to be drawn simultaneously across the drills C by a horse or other convenient power pulling at the draw-chains D, and guided by a pair of stilts, E, in the manner of a plough. Each of the six frames consists of a front guide, $A^1$, and a back guide, $A^2$, connected by a bar, $A^3$, to which is secured a bracket, $F^1$, carrying the hoe-blade F. This blade should be situated midway between the points Y Y of the front and back guides $A^1$ $A^2$, and should be capable of vertical adjustment relative to the bearing-surfaces of the guides, so as to regulate the depth to which the hoe penetrates the ridges. This adjustment may be attained in various ways, such as by inserting packing-pieces of varying thickness between the bracket and the bar $A^3$, or by securing the bracket in the manner shown at Fig. 5, where a strap, G, passing round the transverse rod B, secures the bracket $F^2$ to the latter by means of a wedge, so that by loosening the wedge the bracket can be raised or lowered; or the bracket might be fixed to the front end of the back guide, $A^2$, and the hoe-blade be fixed to the bracket by means of screws passing through slotted holes in the latter to admit of vertical adjustment. The transverse rods B B' pass through vertically-slotted holes in the bracket $F^1$ and part $A^1$ of each frame A, as shown more clearly in Figs. 3 and 4, so that such frames, although coupled together by rods, can accommodate themselves to the level of the ground independently of each other. The frames A are held in equidistant positions upon the transverse rods B B' by means of loose collars H, secured on the rods by set-screws, as shown, so that by shifting the collars the frames A may readily be set closer together or farther apart on the rods B B', according to the spaces at which the crop requires to be thinned. The guides $A^1$ $A^2$ are constructed as inverted troughs, which may be of wood with a metal covering to their curved bearing-surfaces, which must be of sufficient width to prevent their sinking unduly into the soil. They are secured to the connecting-bar $A^3$ by means of bolts passing through slotted holes in the latter, so that they may be adjusted nearer together or farther apart to suit field ridges of different widths.

The action of the machine will be readily understood from Figs. 1, 3, and 4. The machine being drawn forward from the position shown in Fig. 1, the back inclines $a^1$ $a^2$ of the guides descend along the sides of the ridges $C^1$ $C^3$ until the hoe-blade F enters the top of the ridge $C^3$, as shown at Fig. 3. On the further motion of the machine the guides descends slightly more into the furrows, so as to cause the hoe to dig into the ridge sufficiently to remove the plants, after which, on the front inclines $a^3$ $a^4$ of the guides coming in contact with the sides of the ridges $C^2$ $C^4$, the machine is raised, as shown at Fig. 4, whereby the hoe-blade is caused to remove the plants from the ridge $C^3$, and on the machine being raised still higher the plants and earth will drop from the hoe into the furrow between $C^3$ and $C^4$. The incision shown on ridge $C^3$ at Fig. 4 indicates approximately the path of the hoe during the above operation, due allowance being made for irregularities in the ground.

It will be seen that the depth to which the hoe penetrates the ridge is governed by the distance to which it projects below the upper level of the guides. Half an inch is usually sufficient for this purpose, the difference of level between the upper and lower portions of the guides being from two to three inches. In cases where the stems of the plants are strong it is not necessary to cause the hoe to penetrate much into the ridge, and, indeed, in some cases, the hoe will effectually remove the plants by merely pushing against the stems close to the ridge without necessarily entering the latter at all.

Having thus described the nature of my invention, and in what manner the same is to be performed, I claim—

1. The machine herein described for thinning or spacing root and other crops, consisting of a series of hoe-blades F, arranged and operating in combination with guides $A^1$ $A^2$, substantially as hereinbefore set forth.

2. In machines for thinning or spacing root and other crops, the frames A, consisting of the trough-shaped guides $A^1$ $A^2$, connecting-bar $A^3$, and hoe-blade F, coupled together in an adjustable manner by means of the transverse rods B B' and collars H, substantially as hereinbefore described with reference to the accompanying drawings.

In testimony whereof I, the said MARCUS EUSTACE, have signed my name to this specification in the presence of two subscribing witnesses this fourth day of November, 1873.

MARCUS EUSTACE.

Witnesses:
  F. A. LOW,
    *Dublin, N. P.*
  WILLIAM FRY, Jr.,
    13 *Lower Mount Street, Dublin.*